(12) United States Patent
Scarlett et al.

(10) Patent No.: US 6,547,012 B2
(45) Date of Patent: Apr. 15, 2003

(54) METHOD AND APPARATUS FOR CONTROLLING A TRACTOR/IMPLEMENT COMBINATION

(75) Inventors: Andrew James Scarlett, Bedfordshire (GB); John Charles Lowe, Bedford (GB); Tessa Frances MacKenzie, Essex (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/885,200

(22) Filed: Jun. 20, 2001

(65) Prior Publication Data

US 2002/0112864 A1 Aug. 22, 2002

(30) Foreign Application Priority Data

Jun. 26, 2000 (GB) .............................................. 0015465

(51) Int. Cl.[7] .............................................. A01B 79/00
(52) U.S. Cl. ..................... 172/1; 172/7; 172/2; 74/337; 701/50
(58) Field of Search .............................. 172/2, 3, 4, 4.5, 172/7, 1; 701/50, 51, 55; 74/337, 335, 731.1

(56) References Cited

U.S. PATENT DOCUMENTS

| 3,716,104 | A | * | 2/1973 | Koenig et al. |
| 4,385,353 | A | * | 5/1983 | Schneider |
| 4,465,142 | A | * | 8/1984 | Van der Lely et al. |
| 4,518,044 | A | * | 5/1985 | Wiegardt et al. |
| 4,667,744 | A | * | 5/1987 | Kauss et al. |
| 4,846,283 | A | * | 7/1989 | Batcheller |
| 4,878,543 | A | * | 11/1989 | Kauss |
| 5,491,630 | A | * | 2/1996 | Genise et al. |
| 5,564,507 | A | * | 10/1996 | Matsushita et al. |
| 5,830,097 | A | * | 11/1998 | Larkin |
| 5,983,151 | A | * | 11/1999 | Okada et al. |
| 5,992,533 | A | * | 11/1999 | Scarlett et al. |
| 6,116,105 | A | * | 9/2000 | Genise et al. |
| 6,119,786 | A | * | 9/2000 | Creger et al. |
| 6,114,910 | A | * | 11/2000 | Scarlett et al. |
| 6,205,389 | B1 | * | 3/2001 | Genise |

* cited by examiner

Primary Examiner—Victor Batson
(74) Attorney, Agent, or Firm—Larry W. Miller; J. William Stader

(57) ABSTRACT

A tractor/implement combination is controlled through the use of real-time data on the true draft force generated by engagement of an implement with the ground. A method of controlling a tractor/implement combination includes obtaining and storing calibration data on the torque generated at the tractor flywheel, while the implement is disengaged from the ground, including such data the rolling resistance and frictional/parasitic losses between the flywheel and driven wheel axle of the tractor. During subsequent operation of the tractor/implement combination, the calibration data is subtracted from instantaneous data to generate a signal indicative of the implement draft force. The draft force signal may be factored to take account of the tractor power train ratio and the rolling radius of the tractor tires. The method allows generation of accurate draft force data, regardless of the nature and mounting location of the implement.

26 Claims, 2 Drawing Sheets

METHOD AND APPARATUS FOR CONTROLLING A TRACTOR/IMPLEMENT COMBINATION

BACKGROUND OF THE INVENTION

This invention relates to a method and apparatus for controlling an implement connected to a tractor, and more particularly, to a method and apparatus for determining the draft force exerted on the tractor by the implement.

Reference to the term "tractor" is meant to include any vehicle capable of propelling a ground or soil engaging implement for the purpose of processing the ground or soil, or objects (e.g. crops, forage, shellfish) lying on or in the ground or soil. Typically a tractor is a four wheel drive vehicle having a hitch for attachment of an implement behind the vehicle. It is also well known for tractors to push implements, such as furrow presses. The typical configuration of a tractor includes an operator cab mounted at the rear of the vehicle, and a forward-mounted engine and transmission system. However, it is also known to provide a multi-purpose vehicle, that may function as a tractor, having a forward mounted cab and underslung engine and transmission systems beneath a load carrying deck. Other forms of tractors include two wheeled, two wheel drive devices and tracked vehicles that may be coupled to pull or push implements. The invention relates to and embraces within its scope all such tractors.

Tractor/implement combinations are widely used in various processes in agriculture. One of the most common of these is plowing, in which a plow is towed behind a tractor. However, tractors may be used for a great variety of other operations such as spraying, furrow pressing, harrowing, raking, seeding and a number of specialized operations such as arise e.g. in vineyards and estuaries, in which specially designed ground-engaging implements are used. Consequently, references made herein to the term "implement" is intended to include, but not be limited to, plows, harrows, furrow presses, rakes, seed drills, and indeed virtually any device that may be attached to or operated by a tractor and that has the effect of increasing the energy demand of the tractor by virtue of engagement of the implement with the ground or soil or with objects thereon or therein.

Electronic control of the subsystems of tractors is becoming more and more common. For example, EP-A-0 838 141 (the entire disclosure of which is incorporated herein be reference) discloses an integrated control system for tractors by means of which a programmed microprocessor (or series of microprocessors) maximizes the workrate of a tractor e.g. during plowing operations, by comparing the implement draft force against a steady state reference model, and performing implement working width and transmission ratio adjustments in order to maintain a maximal workrate while also maintaining a predetermined implement working depth.

The method and apparatus of EP-A-0 838 141 is most effective when it is possible to obtain an accurate, real time indication of the proportion of the tractor engine output that is attributable to the implement draft force; and the proportion that is attributable to other losses. One way of generating a signal indicative of the implement draft force is to provide a draft force sensing pin (including e.g. a strain gauge forming part of a per se known bridge circuit) in the lower link of the tractor three point hitch. The accuracy of the signal generated from such a sensing pin is acceptable when the implement is a fully-mounted one such as a fully-mounted plow. The accuracy of the draft force sensing pin arrangement is worse for semi-mounted implements such as a semi-mounted plow; and of no use whatsoever with trailed or pushed equipment, that does not place a load on the lower link of the tractor three point hitch.

EP-A-0 741 286 (the entire disclosure of which is incorporated herein by reference) discloses one form of a torque sensor securable to or constituting part of the flywheel of a tractor engine. An arrangement, such as that disclosed in EP-A-0 741 286, that generates a signal indicative of the flywheel torque, is more suitable, than the above-mentioned lower link pin sensor, for control systems controlling a tractor/implement combination, since the engine loading "seen" by the flywheel torque sensor is a total loading value, regardless of whether the implement is trailed, semi-mounted, fully-mounted or propelled in some other way (such as pushed in front of the tractor instead of towed behind the tractor). However, the generated torque signal is dependent upon the selected tractor transmission ratio and tire circumference (or the effective circumference of another driven, ground engaging member if present). Also, the tractor flywheel torque is dependent upon both the implement-imposed drive line load (that tractor/implement control software may seek to maintain constant); and vehicle rolling resistance (RR) and frictional/parasitic losses in the tractor transmission and drive line.

It is possible to devise software in a tractor/implement control system that compensates for variations in the flywheel torque signal arising from the choice of tire circumference and the selected transmission ratio. The compensations needed to account for these variations are likely to be invariant, and may be dealt with in the software algorithm by means of a simple factoring by memory-stored values relating to tire size and transmission ratio. On the other hand the vehicle rolling resistance and frictional/parasitic losses are unlikely to remain constant during operation of the tractor. The rolling resistance component of the flywheel torque is significant, accounting for up to 25% of the flywheel torque.

SUMMARY OF THE INVENTION

It is an object of this invention to provide for the storing of calibration data indicative of the rolling resistance and frictional/parasitic losses acquired when the tractor/implement combination operates in a particular field condition. The stored rolling resistance and-frictional/parasitic loss value may then be subtracted from the real time flywheel torque sensor output signal during use of the tractor in the field in order to give an accurate indication of the engine loading due to the implement draft. The resulting, corrected torque signal may then be used in software and apparatus, e.g. as disclosed in EP-A-0 838 141, as a measure of the implement draft load.

It is a feature of this invention that the tractor includes more than one transmission ratio to vary the draft force with changes in transmission ratio.

It is another feature of this invention to provide calibration data obtainable for more than two transmission ratios.

It is an advantage of this invention to permit a control method to operate an implement with greater accuracy and efficiency.

It is another object of this invention to allow for calculation of the draft force notwithstanding variations in the torque loading caused by the choice of tractor tire (or other driven, ground engaging member) effective circumference and the overall transmission ratio between the tractor engine flywheel and the driven ground engaging member, respectively.

It is still another feature of this invention to store the rolling radius and overall transmission ratio data as one or more lookup tables in a memory forming part of or operatively connected to a control device such as a microprocessor.

It is another advantage of this invention to use the implement draft force signal to initiate or augment a control operation.

It is still another object of this invention to calculate the implement draft force signal according to the formula:

$$\text{Implement Draught (kN)} = \frac{\left[\begin{array}{c}\text{Instantaneous Flywheel} \\ \text{Torque (N.m)}\end{array} - \begin{array}{c}\text{Calibration Flywheel} \\ \text{Torque (N.m)}\end{array}\right] \times PR}{\text{Rear Tire Rolling Radius (m)} \times 1000} \quad (1)$$

here:-

$PR \equiv$ The tractor powertrain ratio, i.e. the transmission and entire driveline ratio from the flywheel to the axle end;

$\dfrac{\text{Instantaneous}}{\text{Flywheel Torque}} \equiv$ "Uncorrected Flywheel Torque"

nd $\dfrac{\text{Calibration}}{\text{Flywheel Torque}} \equiv$ Transmission gear-specific flywheel torque value derived during a "Rolling Resistance" Calibration Procedure.

It is still another advantage of this invention that maintenance of a generally constant implement depth value may be achieved by carrying out a control operation including adjusting or maintaining one or more variable subsystems.

It is another advantage of this invention that the step of detecting the torque at the tractor engine flywheel and generating a signal indicative thereof, while the tractor/implement combination advances across the surface with a first tractor transmission ratio selected, takes place with the tractor engine governor set at approximately a "full throttle" setting.

It is yet another advantage of this invention that the calibration of the tractor/implement combination with the tractor operating at a full throttle setting avoids the need to compensate the flywheel torque value for variations in the governor setting.

It is another feature of this invention to carry out the step of detecting the torque at the tractor engine flywheel and generating a signal indicative thereof while the tractor/implement combination advances across a surface with the implement disengaged from the surface, at a throttle setting less than maximum, whereby the calibration of the tractor/implement combination is normalized to a reference or datum throttle setting, that in practical embodiments is equivalent to a full throttle setting.

It is an object of this invention to use a power shift automatic transmission to provide more accurate control of the tractor/implement combination if the method is temporarily interrupted during transmission shifts.

It is yet another feature of this invention to include a sensor for detecting the selected tractor transmission ratio and generating a signal indicative thereof, the processor optionally or additionally being programmed to compensate the value of the corrected flywheel torque signal for variations arising from the transmission ratio selected.

It is yet another object of this invention to permit adjustment and/or maintenance of the implement working depth and the tractor transmission ratio in order to maximize tractor/implement combination workrate while maintaining an optimal implement draft.

It is a further feature of this invention to store in the memory of the tractor/implement combination a steady state reference model.

It is still a further object of this invention to calculate the degree of wheelslip by subtracting the true vehicle speed value from a theoretical value simply derived from the wheel speed. If the degree of wheelslip exceeds an operator inputted or software imposed limit, control software may operate an actuator in order to reduce wheelslip to within acceptable limits. This ensures an efficient tractive effort and assists in maximizing workrate of the tractor/implement combination.

It is still another feature of this invention to raise the three point hitch of the tractor to reduce wheelslip in an attempt to reduce the implement draft force and consequently reduce wheelslip.

It is yet another feature of this invention to control a mid-axle mounted wheel, mounted on an actuator strut whose length is adjustable by means of an hydraulic remote service valve by controlling the working depth of the rear section of the implement.

It is an advantage of this invention that the change in implement draft force resulting from the raising operations, that in turn reduces the tractor wheelslip, is less pronounced and results in a greater efficiency of the tractor/implement combination operation.

It is a feature of this invention that the length adjustable actuator includes a fluid actuator whereby the step of lowering the second portion of the semi-mounted implement includes exhausting fluid from the actuator via the spool valve.

These and other objects, features and advantages are accomplished according to the instant invention by providing a control for a tractor/implement combination in which the real-time data on the true draft force generated by engagement of an implement with the ground. A method of controlling a tractor/implement combination includes obtaining and storing calibration data on the torque generated at the tractor flywheel, while the implement is disengaged from the ground, including such data the rolling resistance and frictional/parasitic losses between the flywheel and driven wheel axle of the tractor. During subsequent operation of the tractor/implement combination, the calibration data is subtracted from instantaneous data to generate a signal indicative of the implement draft force. The draft force signal may be factored to take account of the tractor power train ratio and the rolling radius of the tractor tires. The method allows generation of accurate draft force data, regardless of the nature and mounting location of the implement.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENTS

Figure 1:
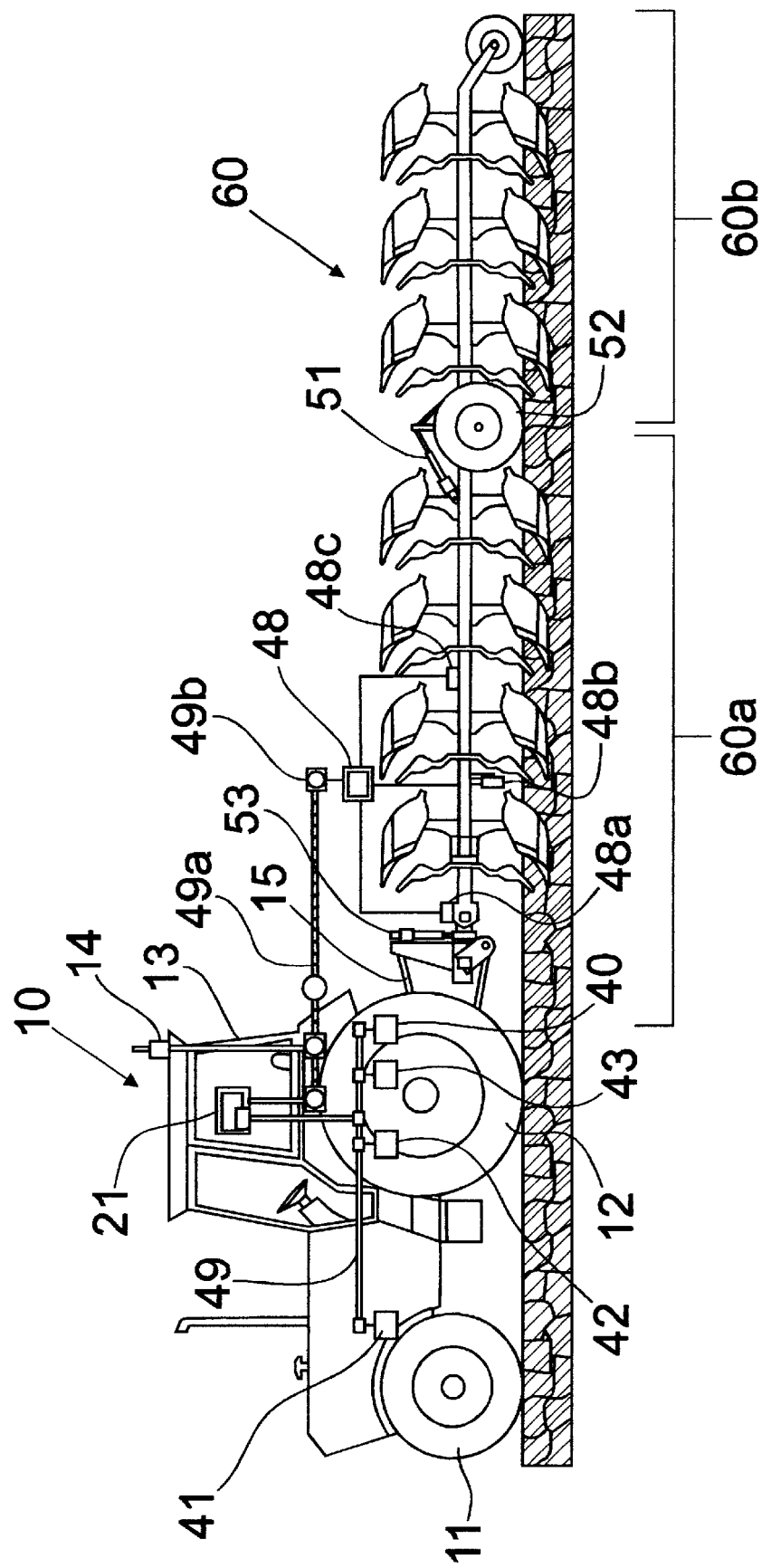
FIG. 1 is a schematic representation of a tractor/implement combination according to the invention.

Referring to the drawings, there is shown an agricultural tractor denoted by the reference numeral 10. In common with such vehicles in use nowadays, tractor 10 has a plurality of driven, ground engaging members in the form of front 11 and rear 12 pairs of driven wheels, although as noted herein other kinds of tractors, including those that do not include four driven wheels and/or a rear mounted operator cab, are within the scope of the invention. As an example of another kind of tractor there are known vehicles in which one or both the pairs of driven wheels are substituted by sets of caterpillar tracks. Such tractors are within the scope of the invention. Tractor 10 also has an engine (not shown in the drawings), a transmission system including a gearbox, transfer box and appropriate differentials for the driven wheels; an operator cab 13 and a three point hitch 15 at the rear of the vehicle between the rear wheels for attachment of an adjustable implement, which in the embodiment shown is a plow 60.

Thus the tractor/implement combination 10 may be regarded as comprising a plurality of controllable sub-systems, each of which influences the performance of the tractor in dependence on the prevailing conditions. The sub-systems include the engine (adjustable in one of two ways, i.e. by means of a throttle setting or by means of an engine governor setting, depending on the engine type); the transmission (adjustable by virtue of selection of gear ratios); the three point hitch 15; and the plow 60 adjustable in a manner described below by adjustment of one or more actuators. Tractor/implement combination 10 includes a plurality of slave controllers for the sub-systems, in the form of microprocessors 40, 41, 42, 43 and 48.

External hydraulics control subsystems 40 controls the flow of hydraulic fluid to actuators, located externally of the tractor, that draw hydraulic power from the on-board hydraulic circuit of the tractor. Certain parameters of the engine performance are controlled by means of an engine management system including microprocessor 41 that optimizes engine performance in dependence on the throttle or engine governor settings input either by the tractor operator using suitable control members indicated schematically at 21, or from a programmable controller constituted as a further microprocessor also signified schematically by numeral 21 (described in greater detail in EP-A-0 838 141), located in the cab of the FIG. 1 vehicle. The engine management system operates by adjusting various parameters, such as the metering volume of a fuel injection system, the timing of the fuel injection system, the boost pressure of a turbocharger (if present), the opening of engine valves and the opening of portions of the vehicle exhaust system, via suitable powered actuators such as solenoids.

Tractor 10 includes a semi-automatic transmission system in which the transmission ratio selected is determined by a slave controller in the form of microprocessor 42 acting on one or more solenoids to engage and disengage gear sets of the gearbox and/or gears of the transfer box, in dependence on the settings of a plurality of gear levers in the operator's cab 13 or in dependence on signals from microprocessor 21.

The embodiment depicted in FIG. 1 includes a hitch microprocessor 43 and a plow control microprocessor 48. Microprocessor (slave controller) 43 controls the positions (i.e. the heights) of the elements of the implement (three point) hitch 15. Again, the microprocessor 43 controls a number of actuators such as solenoids in dependence on the settings of control levers etc in the operator's cab 13, on signals received from a further microprocessor 21, or, during carrying out of the method of the invention in dependence on its own programming.

Microprocessor 48 is in the embodiment shown in FIG. 1 operatively connected to actuators, e.g. respective hydraulic actuators, for adjusting the width of the plow; for inverting the plow at the end of each furrow; and for setting the plow working depth. Microprocessor 48 operates in dependence on signals received from microprocessor 21; from lever settings in cab 13; or according to its own programming. The plow adjustment actuators are known per se and are optional features of the tractor/implement combination.

FIG. 1 also shows optional sensors 48a, 48b and 48c (illustrated schematically) whose purpose is the detection of the condition of the various plow adjustment actuators. Sensor 48a detects the state of a plow turnover actuator and hence indicates the orientation of the plow. Sensors 48b and 48c respectively detect the working depth and working width of the plow 60. The microprocessor preferably are interconnected via a vehicle CAN-BUS 49, an extension 49a of which connects microprocessor 48 (and sensors 48a–48c) via a node 49b. Cab 13 has mounted thereon an optional GPS position sensor 14 also connected to the CAN-BUS and hence to the microprocessors.

Plow 60 is in the embodiment shown a semi-mounted implement. The implement mounted actuators are described in more detail below. By "semi-mounted" is meant an implement the working depth of the front part 60a of which is adjusted by adjusting the height of the tractor implement hitch; and the height of a second part 60b, to the rear of part 60a, by an actuator 51 on the implement itself. The use of a semi-mounted implement is not essential for carrying out the method of the first aspect of the invention which, as noted hereinabove, is suitable for controlling tractor/implement combinations including a wide variety of implements that need not be towed behind the tractor. However, the method of the third aspect of the invention is well suited to a tractor/implement combination in which the implement is semi-mounted, hence the exemplary implement shown in FIG. 1.

As shown in FIG. 1, part way along its length plow 60 includes a mid-axle mounted wheel 52, relative to the location of which the rear portion 60b of plow 60 is pivotable. Actuator 51 operates under the control of microprocessor 40 to effect such pivoting of plow rear portion 60b, in dependence on a control algorithm described in more detail hereinbelow in connection with a wheelslip control for the tractor/implement combination.

Figure 2:
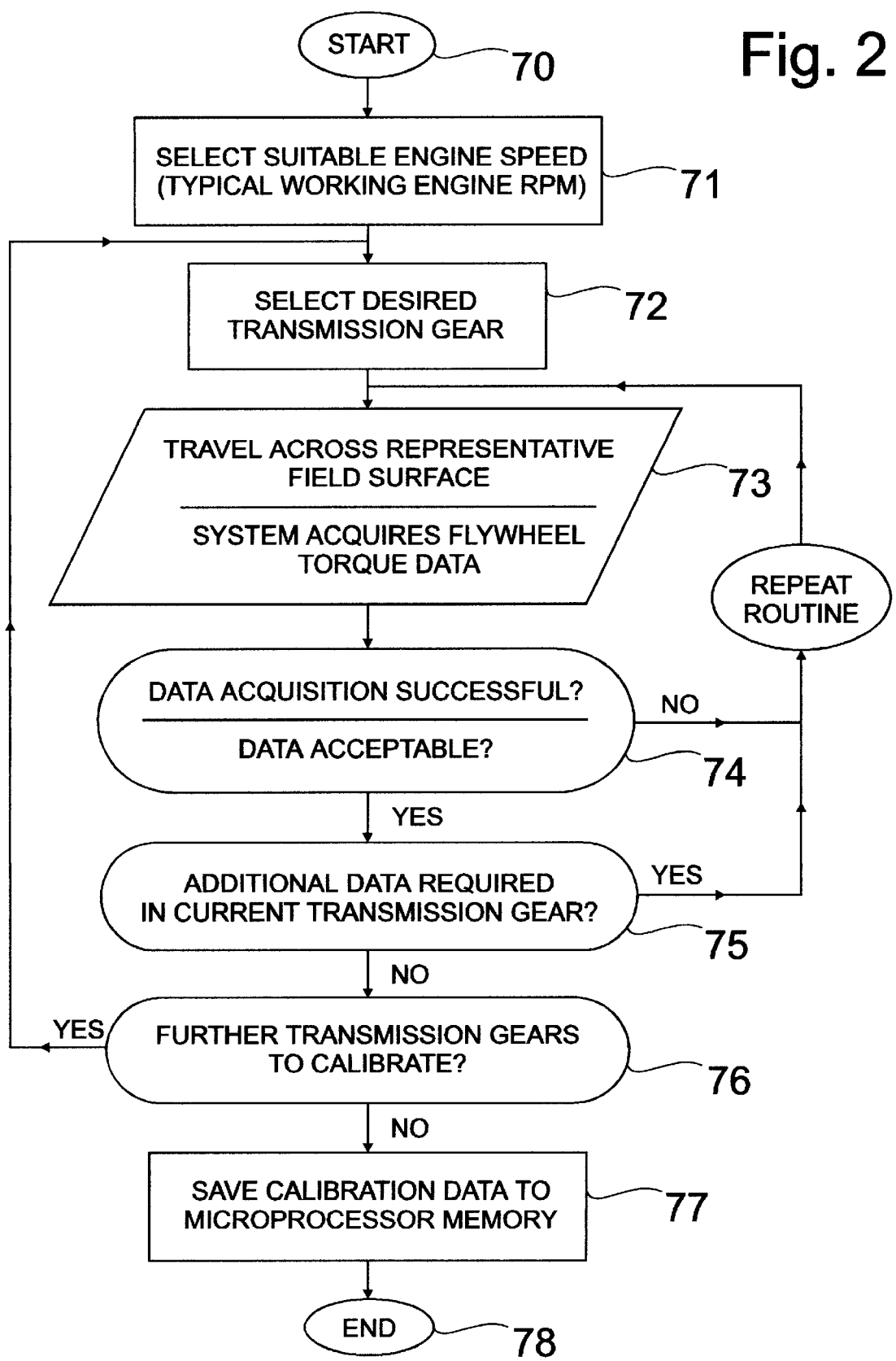
FIG. 2 is a flow chart showing the steps of a first aspect of the method of the invention.

Referring now to FIG. 2 there is shown a flow chart summarizing the method steps by which a tractor/implement combination such as, but not limited to, the arrangement shown in FIG. 1 may be operated in order to provide an accurate calibration indicator of the draft force of an implement such as plow 60. The steps of FIG. 2 are normally carried out at the start of a period of operation, so that subsequent real time flywheel torque data acquired during use of the combination 10 may be corrected. However it is, equally, within the scope of the invention to carry out the calibration steps part way through a period of operation. This may be desirable e.g. if the field conditions change part way through a plowing operation.

The method of FIG. 2 is preferably but not necessarily implemented by e.g. microprocessor 21 of tractor/ implement combination 10. At the start of the method (step 70) the software implementing the method carries out any initialization routines that are desirable. Such routines will in themselves be readily realizable within the knowledge of a worker skilled in the relevant art and are not described in detail herein. When the method of the invention is carried out as part of a more extensive control method the initialization of the software and of any programmable components connected thereto may be carried out as part of another method not described herein in detail.

At step 71, depending on the precise nature of the programming either the software or the tractor operator selects a typical engine speed for a data acquisition run. At step 72 the tractor operator selects an initial transmission ratio for a first data acquisition run. If desired the control software can prompt the operator to make the selection, e.g. by displaying a message via eg. a configurable operator display in the operator's cab 13. Following selection of the basic operating variables at steps 71 and 72 the tractor advances across a field surface with the implement such as plow 60 not engaging the ground. During this process the software acquires data from the flywheel torque sensor disclosed herein. Step 73 represents this part of the method.

Steps 74 and 75 respectively cause looping of the method to step 73 in the event of the data acquisition being unsuccessful or the data being corrupted (step 74); or in the event of further data being required in the currently selected transmission ratio (step 75). Clearly under such circumstances there is no need for the iteration to include selection of a further transmission ratio. One exemplary circumstance under which further data may be required arises when the tractor/implement combination operates in a sloping field. If the field is generally flat with only isolated slopes, at plowing speeds (approximately 4.5–8 km/h), the effect of the slopes is likely to be insignificant. However, if the field has substantially no flat areas (so that the tractor/implement combination is always travelling either uphill or downhill) it may be desirable to allow for the effect of this on the measured torque values.

One way of achieving this is for the tractor operator to carry out two data acquisition runs before commencing plowing operations, i.e. one with the tractor/implement combination 10, travelling uphill and one with it travelling downhill. The uphill and downhill calibration torque values can then be averaged and their average value used as the calibration flywheel torque value in Equation 1. If the tractor/implement combination 10 includes an inclinometer whose output is input to the microprocessor 21 the latter can be programmed to provide an audible and/or visible warning to the tractor operator, if he attempts to commence a data acquisition run on sloping ground. The operator may then have the option of confirming or denying (e.g. through menu screen choices) to the microprocessor that the field is substantially non-flat.

If the inclinometer is not present, the tractor operator may optionally select operation of step 75, e.g. through use of a push button or a menu screen selection. The software will in either case "know" that the data acquisition run should consist of two parts (i.e. uphill and downhill runs); and subsequent averaging. Step 75 represents these options schematically.

It is necessary for the method to include acquisition of data in a range of transmission ratios, corresponding to the ratios normally selected by the operator during normal use of the implement in question. Step 76 causes looping of the control program to repeat the method steps 72 to 75 for a suitable range of the tractor's transmission ratios. In other words, the transmission ratio may be shifted to a new value for each iteration until all the ratios in a chosen range have been used. Once the data acquisition is complete for all the necessary ratios, at step 77 the software saves the resulting calibration data to a memory (e.g. forming part of or otherwise associated with microprocessor 21).

The software includes an end routine 78 that may include per se known steps such as zeroing of registers and/or setting voltages to predictable values. During subsequent operation of the tractor/implement combination 10 with the implement 60 engaged with the soil or with objects thereon the software acquires real time (instantaneous) torque data from the flywheel torque sensor. The stored calibration data corresponding to the transmission ratio and engine speed used during such operation are subtracted from the real time data. The result of the subtraction is then factored for the overall transmission ratio between the tractor flywheel and the driven ground engaging member (e.g. a wheel or a caterpillar track); and also for the effective circumference of the member. The subtraction and factoring occur in accordance with the following equation:

$$\text{Implement Draught (kN)} = \frac{\left[\dfrac{\text{Instantaneous Flywheel}}{\text{Torque (N.m)}} - \dfrac{\text{Calibration Flywheel}}{\text{Torque (N.m)}}\right] \times PR}{\text{Rear Tire Rolling Radius (m)} \times 1000} \quad (1)$$

here:-

$PR \equiv$ The tractor powertrain ratio, i.e. the transmission and entire driveline ratio from the flywheel to the axle end;

$\text{Instantaneous Flywheel Torque} \equiv$ "Uncorrected Flywheel Torque"

nd $\text{Calibration Flywheel Torque} \equiv$ Transmission gear-specific flywheel torque value derived during a "Rolling Resistance" Calibration Procedure.

In the preferred embodiment, microprocessor 21 carries out the manipulation according to Equation 1. The above factoring equation in practice relies on stored data corresponding to the overall transmission ratio and the effective circumference of the tractor tire or track. These data may be stored in a memory e.g. forming part of or associated with microprocessor 21. They may be preprogrammed by the tractor manufacturer; or programmed by the tractor operator e.g. in the event of a change to tires of different diameter. The use of Equation 1 gives an actual draft force signal, that may be used to influence a control action. Thus the use of Equation 1 automatically compensates the actual flywheel torque value for the undesirable variables discussed herein.

The control action typically involves adjusting one or more variable subsystems of the tractor/implement combination. These may include but are not limited to the following subsystems:

the selected tractor transmission ratio;
the implement working depth;

the implement working width;

the tractor engine governor setting; and the tractor engine power output.

The control action in particular may include adjusting e.g. the working width or depth of a plow or shifting the tractor transmission. Various actuators, represented schematically by actuator 53 of FIG. 1, may be operated for such purposes.

Normally the calibration run described herein in relation to FIG. 2 takes place with the engine governor at approximately a "full throttle" setting. However it is also within the scope of the invention for the calibration run to occur with the engine governor set at a "partly open throttle" setting. In the latter case the software may be programmed further to compensate the calibration draft force values, to generate values equivalent to a "full throttle" calibration run. If at any time during operation of the tractor/implement combination (when the implement is semi-mounted as shown in FIG. 1) the microprocessor 21 (or another of the microprocessors) detects slip of the driven wheels (or other ground engaging members), the working depth of the implement 60 may be raised. This is achieved by a simple control algorithm that operates hitch 15 and actuator 51 until wheelslip is no longer detected.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of controlling a tractor/implement combination comprising the steps of:

(i) detecting the torque at the tractor engine flywheel, and generating a signal indicative thereof while the tractor/implement combination advances across a surface with a first tractor transmission ratio selected and the implement disengaged from the surface;

(ii) storing in a memory the value of the signal as a calibration value associated with the selection of the first transmission ratio;

(iii) detecting the torque at the tractor engine flywheel and generating an uncorrected torque signal indicative thereof while the tractor/implement advances across the surface with one of said transmission ratios selected, and with the implement engaging the surface;

(iv) subtracting the stored calibration value associated with the selected said transmission ratio from the value of the uncorrected torque signal to generate a corrected torque signal indicative of the draft of the implement; and (v) carrying out a control operation dependant upon the value of the corrected torque signal.

2. The method of claim 1, further comprising the step of:

(vi) shifting the tractor transmission to a new ratio and repeating steps (i) and (ii) while the tractor/implement combination advances with said new ratio to store a new calibration value associated with said new ratio;

wherein the tractor includes more than one transmission ratio.

3. The method of claim 2, further comprising the step of:

(vii) repeating step (vi) a plurality of times to store a plurality of calibration values, each said calibration value respectively associated with a tractor transmission ratio;

wherein the tractor includes more than two transmission ratios.

4. The method of claim 3, wherein said corrected torque signal value is factored by an amount that is inversely proportional to the rolling radius of at least one driven, ground engaging member of the tractor.

5. The method of claim 4, wherein said corrected torque value is factored by an amount that is proportional to the transmission ratio of the tractor driveline between the tractor engine output and at least one driven, ground engaging member of the tractor.

6. The method of claim 5, further comprising the steps of:

(viii) calculating, from said corrected torque signal, the value of the draft force arising from engagement of the implement with the surface; and (ix) adjusting or maintaining one or more variable subsystems of the tractor/implement combination in order to maintain a generally constant implement working depth while the implement engages the surface.

7. The method of claim 6, wherein said adjusting or maintaining step includes at least one variable subsystem selected from the group including:

the selected tractor transmission ratio;

the implement working depth;

the implement working width;

a tractor engine governor setting; and the tractor engine power output.

8. The method of claim 6, wherein the steps of detecting the torque takes place with the tractor engine running at approximately a frill throttle setting.

9. The method of claim 6, wherein the steps of detecting the torque takes place with the tractor engine running at a partially-open throttle setting, and wherein the method further comprises the steps of:

(x) detecting a governor setting and generating a signal indicative thereof;

(xi) adjusting the torque value in dependence on the governor setting signal to provide a value equivalent to a full throttle setting for the tractor engine during operation of the tractor/implement combination with the implement disengaged from the surface.

10. The method of claim 6, wherein the step of detecting the torque in step (i) includes the sub-steps of:

(i.a) advancing the tractor/implement combination in a first direction while detecting the torque at the tractor engine flywheel, and generating a first direction signal indicative thereof;

(i.b) advancing the tractor/implement combination in a second direction while detecting the torque at the tractor engine flywheel, and generating a second direction signal indicative thereof; and (i.c) averaging said first direction and second direction signals for storing at step (ii).

11. The method of claim 10, wherein the tractor/implement combination includes an inclinometer capable of indicating whether said tractor/implement is on inclined ground, the method further comprising the sub-steps of:

(i.d) generating a warning to the operator when said tractor/implement combination is on inclined ground; and (i.e) permitting an operator to implement said steps of detecting the torque in a form modified to take account of the inclination of the ground.

12. A tractor/implement combination comprising:
a first sensor for detecting the tractor engine flywheel torque and generating a signal indicative thereof;
an actuator for selectively engaging the implement with and disengaging it from a surface;
a second sensor for detecting the selected transmission ratio of the tractor and generating a signal indicative thereof;
a memory; and
a programmed processor, said tractor/implement combination being operable, under control of the processor
  (i) to detect the torque at the tractor engine flywheel, and generate a signal indicative thereof while said tractor/implement combination advances across a surface with a first tractor transmission ratio selected and the implement disengaged from the surface;
  (ii) to store in said memory the value of the signal as a calibration value associated with the selection of the first transmission ratio;
  (iii) to shift the tractor transmission to a new ratio and repeat steps (i) and (ii) while the tractor/implement combination advances with said new ratio to store a new calibration value associated with the new ratio;
  (iv) to shift the tractor transmission a plurality of times to store a plurality of calibration values each said calibration value respectively associated with a tractor transmission ratio;
  (v) to detect the torque at the tractor engine flywheel and generate an uncorrected torque signal indicative thereof while the tractor/implement advances across the surface with one of transmission ratios selected, and with the implement engaging the surface;
  (vi) to subtract the stored calibration value associated with the selected said transmission ratio from the value of the uncorrected signal to generate a corrected torque signal indicative of the draft of the implement; and
  (vii) to carry out a control operation dependant upon the value of the corrected torque signal.

13. The tractor/implement combination of claim 12, wherein the memory includes tire data indicative of the circumference of one or more driven ground engaging members of the tractor and wherein said processor is programmed to factor the value of the corrected torque signal by an amount proportional to the circumference.

14. The tractor/implement combination of claim 13, further including a third sensor for detecting the selected tractor transmission ratio and generating a signal indicative thereof, the processor optionally being programmed to factor the value of the corrected torque signal by an amount proportional to the overall transmission ratio between the tractor engine flywheel and said one or more driven, ground engaging members.

15. The tractor/implement combination of claim 14, further including an actuator for increasing and decreasing a working depth of the implement in dependence on an output of the processor.

16. The tractor/implement combination of claim 15, further including an actuator for shifting the tractor transmission in dependence on an output of the processor.

17. The tractor/implement combination of claim 16, further including a plurality of further sensors for detecting a plurality of further variables of said tractor/implement combination and for generating further signals indicative thereof;
  wherein the processor is programmed to optimize the workrate of the tractor in dependence on the values of the further signals by operating said actuator.

18. The tractor/implement combination of claim 17, wherein the memory includes a steady state reference model of outputs of the sensors and the further sensors, the processor being programmed to employ the reference model to optimize a workrate of the combination.

19. The tractor/implement combination of claim 18, further including:
  an inclinometer capable of indicating whether the combination is on inclined ground; and
  an indicator for generating a warning to the operator that the tractor/implement combination is on inclined ground.

20. A method of controlling tractor wheelslip in a tractor/implement combination in which a tractor three point hitch at least partly supports the implement and in which the implement is semi-mounted by means of a mounting remote from the three point hitch, the method comprising the steps of:
  (i) setting a wheelslip limit corresponding to a desired maximum degree of wheelslip;
  (ii) detecting an instantaneously prevailing degree of wheelslip;
  (iii) raising a first part of the implement by raising the three point hitch when the detected degree of wheelslip equals or exceeds the wheelslip limit; and
  (iv) raising a second part of the implement relative to the remote mounting until the detected degree of wheelslip is less than the wheelslip limit.

21. The method of claim 20, wherein the step of raising the second part of the implement occurs according to an open loop control algorithm.

22. The method of claim 21, wherein the step of raising the second part of the implement is accomplished in a plurality of increments, each said increment being separated from one another by a time delay.

23. The method of claim 22, wherein the remote mounting includes a wheel mounted mid-axle, a remote part of the implement being moveably secured to said wheel by a mechanism including a length-adjustable actuator; and
  wherein the step of raising the mounting includes adjusting the length of the actuator.

24. The method of claim 23, further comprising the steps of:
  (v) lowering the first part of the implement by lowering the three-point hitch; and
  (vi) lowering the second part of the implement relative to the remote mounting.

25. The method of claim 24, wherein the length-adjustable actuator includes a fluid actuator having a spool valve, and wherein the step of lowering the second portion includes exhausting fluid from the actuator via the spool valve.

26. A tractor/implement combination wherein a tractor three point hitch supports part of the implement; and wherein the implement is semi-mounted by means of a mounting remote from the three point hitch, comprising:
  a wheelslip detector;
  an actuator for raising and lowering the three point hitch;
  an actuator for raising and lowering a part of the implement relative to the remote mounting;
  a processor capable of generating adjustment signals for causing adjustment of the hitch height and the actuator height; and
  a memory capable of storing therein a wheelslip limit value, the processor being programmed to optimize wheelslip by adjusting the hitch height and the actuator height.

* * * * *